US006975749B2

(12) United States Patent
Chujoh et al.

(10) Patent No.: US 6,975,749 B2
(45) Date of Patent: *Dec. 13, 2005

(54) TRAFFIC DENSITY ANALYSIS METHOD BASED ON ENCODED VIDEO

(75) Inventors: Takeshi Chujoh, Tokyo (JP); Toshiaki Watanabe, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 32 days.

This patent is subject to a terminal disclaimer.

(21) Appl. No.: 10/817,840

(22) Filed: Apr. 6, 2004

(65) Prior Publication Data

US 2004/0190755 A1 Sep. 30, 2004

Related U.S. Application Data

(63) Continuation of application No. 09/772,887, filed on Jan. 31, 2001, now Pat. No. 6,744,908.

(30) Foreign Application Priority Data

Feb. 29, 2000 (JP) ............................ 2000-054948

(51) Int. Cl.[7] ................................................ G06K 9/00

(52) U.S. Cl. ...................... 382/104; 382/236; 340/917; 348/113

(58) Field of Search ................................ 382/100, 103, 382/104, 105, 106, 107, 154, 162, 163, 165, 382/166, 170, 173, 183, 193, 195, 197, 199, 382/209, 232, 233, 234, 236, 250, 253, 254, 382/274, 285, 287, 291, 305, 312; 375/240.26, 375/240.1, 240.16; 345/166, 850, 501, 100; 340/907, 917; 348/148, 149, 113, 154; 356/3, 356/27; 701/207, 205

(56) References Cited

U.S. PATENT DOCUMENTS

| | | | | |
|---|---|---|---|---|
| 3,659,085 | A * | 4/1972 | Potter et al. | 701/207 |
| 5,598,216 | A * | 1/1997 | Lee | 375/240.16 |
| 5,774,569 | A * | 6/1998 | Waldenmaier | 382/100 |
| 6,011,564 | A * | 1/2000 | Furuhashi et al. | 345/501 |
| 6,411,328 | B1 * | 6/2002 | Franke et al. | 348/149 |
| 6,452,579 | B1 * | 9/2002 | Itoh et al. | 345/100 |
| 6,498,816 | B1 * | 12/2002 | Easwar et al. | 375/240.26 |
| 6,757,328 | B1 * | 6/2004 | Huang et al. | 375/240.1 |

OTHER PUBLICATIONS

Naohiro Amamoto, et al., Electronics and Communications in Japan, vol. J81-A, No. 4, pp. 527-535, “Detecting Obstructions and Tracking Moving Objects by Image Processing Technique”, Apr. 1998 (with corresponding English translation: Electronics and Communications in Japan, Part 3, vol. 82, No. 11, pp. 28-37, 1999).

* cited by examiner

*Primary Examiner*—Daniel Miriam
*Assistant Examiner*—Seyed Azaraian
(74) *Attorney, Agent, or Firm*—Oblon, Spivak, McClelland, Maier & Neustadt, P.C.

(57) ABSTRACT

A traffic density analysis method includes decoding encoded video data corresponding to an analysis region to obtain a decoded video signal and code information, determining a moving object in units of a macroblock on the basis of the decoded video signal, the code information and a previously decoded video signal, analyzing a macroblock determined as the moving object, setting a specific region in a screen using an analysis result of the macroblock, and estimating a traffic density in the analysis region from information related to the moving object passing through the specific region.

4 Claims, 5 Drawing Sheets

TRAFFIC DENSITY ANALYSIS METHOD BASED ON ENCODED VIDEO

CROSS-REFERENCE TO RELATED APPLICATIONS

This application is a continuation of U.S. application Ser. No. 09/772,887 filed Jan. 31, 2001, now U.S. Pat. No. 6,744,908, and further is based upon and claims the benefit of priority from the prior Japanese Patent Application No. 2000-054948, filed Feb. 29, 2000, the entire contents of both are incorporated herein by reference.

BACKGROUND OF THE INVENTION

The present invention relates to a traffic density analysis apparatus for analyzing the traffic density from a video image.

To detect vehicles from a video image and analyze the traffic density, generally, a change in pixel values in a video screen must be checked. However, such processing related to pixel values requires a large calculation amount. For example, for CIF format often used in ITU-T H.261, H.263, ISO/IEC MPEG-4 or the like, processing must be performed for 352×288 pixels, i.e., a total of 101,376 pixels. For such processing with a large calculation amount, dedicated hardware must be prepared, resulting in a serious problem of cost.

As described above, the prior art requires a very large calculation amount to analyze the traffic density by detecting vehicles from a video image.

BRIEF SUMMARY OF THE INVENTION

It is an object of the present invention to provide a traffic density analysis apparatus based on an encoded video, which can perform high-speed stable analysis.

According to the present invention, there is provided a traffic density analysis apparatus based on an encoded video, which stably executes analysis at a high speed with a small calculation amount by narrowing down a region to undergo traffic density analysis processing using a video encoding/decoding technique.

According to the present invention, there is provided a traffic density analysis apparatus comprising a video decoder section which decodes video encoded data obtained by encoding a video signal corresponding to an analysis region and outputs a decoded video signal, and an analyzer section which sets a specific region in a screen for the decoded video signal output from the video decoder section and analyzes a traffic density in the analysis region from information related to a moving object which passes through the specific region.

In the analyzer section, for example, it is determined, whether each of predetermined blocks is a moving object, from information contained in the video encoded data and pieces of information of current and previous frames of the decoded video signal. Image analysis is performed for the decoded video signal in a block determined as a moving object, thereby acquiring object information related to setting of the specific region and the moving object.

More specifically, in the analyzer section, for example, the traffic density is estimated using the average velocity and number of moving objects which pass through the specific region as the information related to the moving object which passes through the specific region.

According to the present invention, there is also provided a traffic density analysis apparatus comprising a video encoder section which encodes a video signal corresponding to an analysis region and outputs video encoded data, and an analyzer section which sets a specific region in a screen for a local decoded signal generated by the video encoder section and analyzes a traffic density in the analysis region from information related to a moving object which passes through the specific region.

The analyzer section determines whether each of predetermined blocks is a moving object from information contained in the video encoded data and pieces of information of current and previous frames of the local decoded signal, and performs image analysis for the local decoded signal in a block determined as a moving object, thereby acquiring object information related to setting of the specific region and the moving object.

In this analyzer section as well, for example, the traffic density is estimated using the average velocity and the number of moving objects which pass through the specific region as the information related to the moving object which passes through the specific region.

As described above, in the traffic density analysis apparatus of the present invention, the traffic density can be stably analyzed at a high speed with a small calculation amount by narrowing down a region to undergo actual traffic density analysis processing to a specific region using information generated by the video decoding apparatus or video encoding apparatus.

DETAILED DESCRIPTION OF THE INVENTION

The embodiments of the present invention will be described below with reference to the accompanying drawing.

(First Embodiment)

Figure 1:
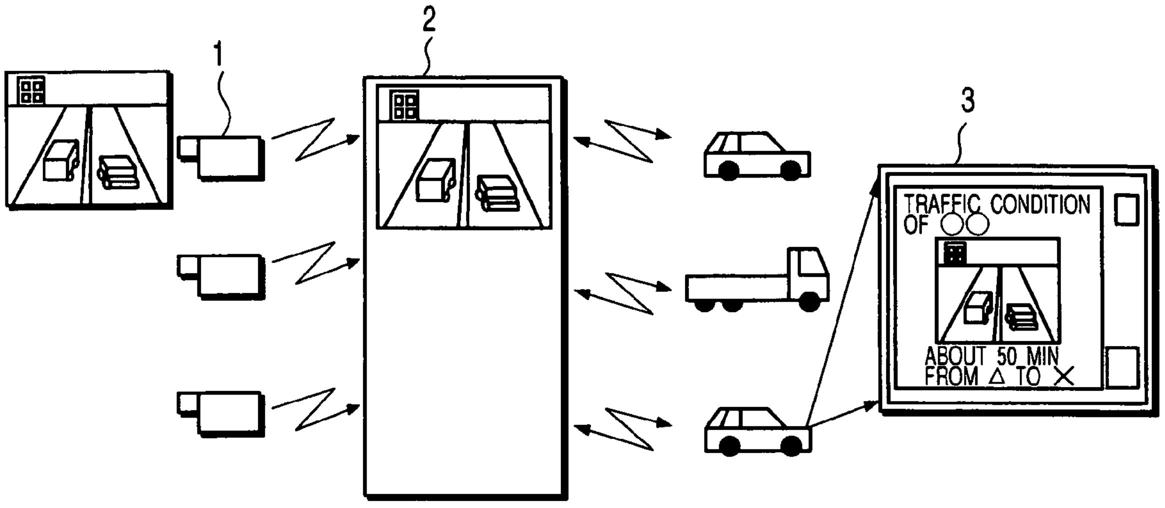
FIG. 1 is a view showing the arrangement of a traffic density monitoring system using a traffic density analysis apparatus according to the first embodiment of the present invention.

FIG. 1 shows the overall arrangement of a traffic density monitoring system according to the first embodiment of the present invention. This traffic density monitoring system comprises monitor camera sections 1, a monitoring center 2, and a terminal section 3.

Each monitor camera section 1 is installed in a monitor region (road whose traffic density should be monitored) to encode a video image obtained by sensing the monitor region and transmit the video encoded data to the monitoring center 2 through a cable or radio public channel or a radio channel. The monitoring center 2 decodes and analyzes video encoded data of images sensed by the monitor camera sections 1 in the respective regions, generates necessary traffic information in consideration of position information and request information from the terminal sections 3, and transmits the traffic information to the terminal sections 3. Each terminal section 3 is installed in a car that travels on the road to transmit position information or request information to the monitoring center 2 and receive necessary traffic information and video information.

Figure 2:
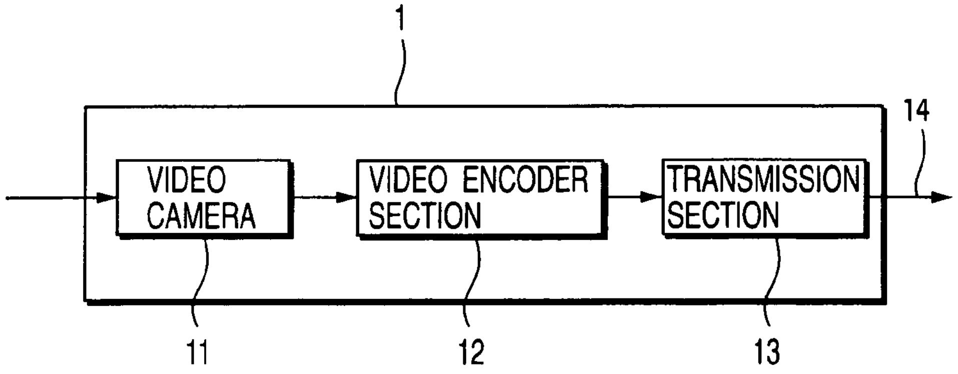
FIG. 2 is a block diagram showing the arrangement of a monitor camera of the first embodiment.

FIG. 2 shows the arrangement of the monitor camera section 1 of this embodiment. A video signal output from a video camera 11 is compress-encoded by a video encoder section 12, and the thus obtained video encoded data is transmitted to the monitoring center 2 through a cable or radio public channel or a dedicated line.

Figure 3:
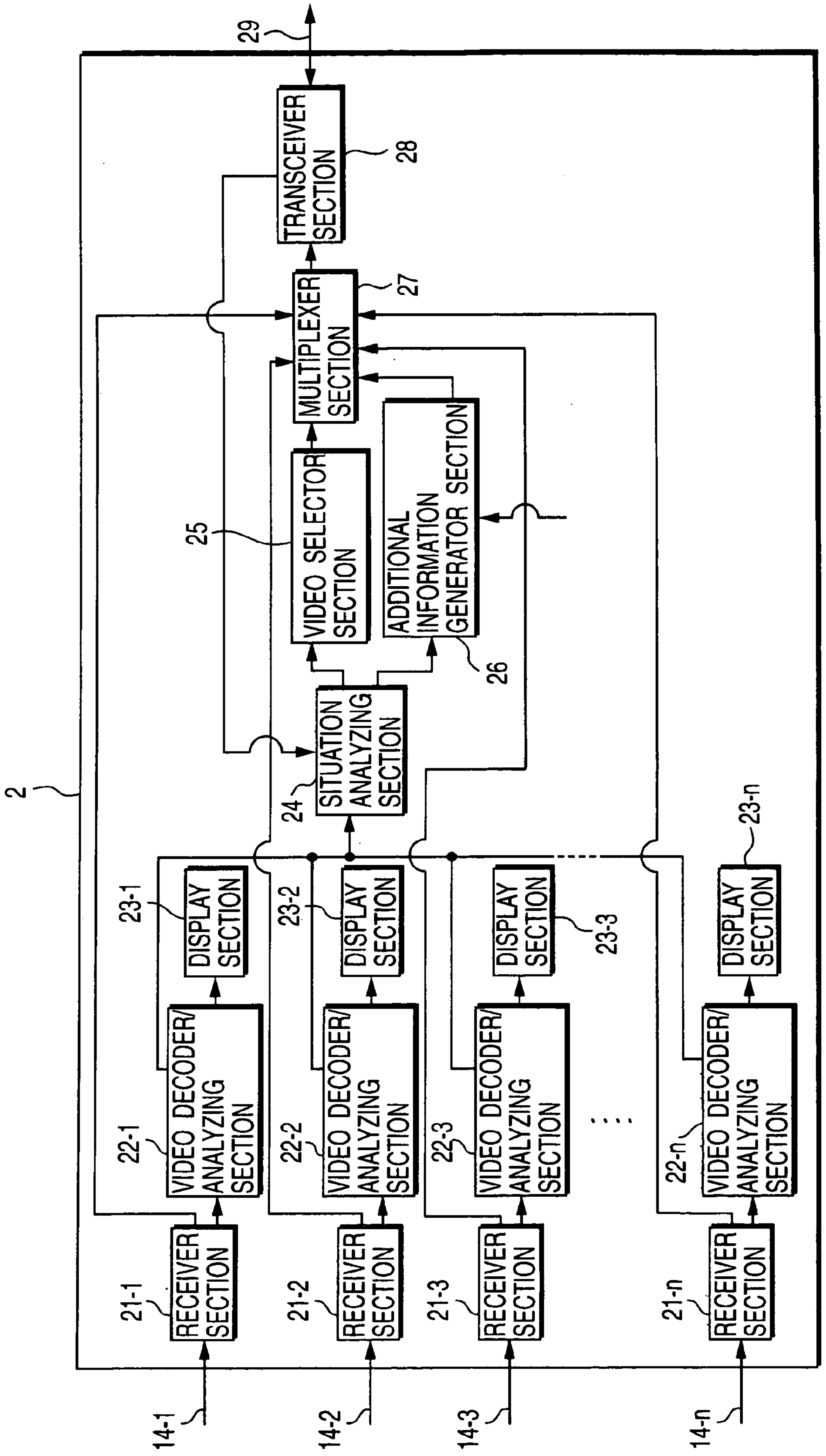
FIG. 3 is a block diagram showing the arrangement of a monitoring center of the first embodiment.

FIG. 3 shows the arrangement of the monitoring center 2 of this embodiment. Video encoded data transmitted from the plurality of (n) monitor camera sections 1 through a cable or radio dedicated line or public channel are received by receiver sections 21-1 to 21-n, respectively, and sent to video decoder/analyzer sections 22-1 to 22-n and multiplexer section 27.

The video decoder/analyzer sections 22-1 to 22-n (to be described later in detail) decode video encoded data, display video images obtained by decoding, i.e., images obtained by the monitor camera sections 1 on display sections 23-1 to 23-n, respectively, and simultaneously analyze the traffic density. The analysis results from the video decoder/analyzer sections 22-1 to 22-n are collected by a situation analyzing section 24.

Position information or request information of each car from the terminal section 3 is received by a transceiver section 28 and input to the situation analyzing section 24. The situation analyzing section 24 systematically analyzes the analysis results obtained by analyzing the images from the monitor camera sections 1 by the video decoder/analyzer sections 22-1 to 22-n and the position information and request information from the terminal sections 3. A video selector section 25 selects a necessary image from the analysis result from the situation analyzing section 24. An additional information generator section 26 generates message or voice information, as needed, on the basis of the operation of an operator who checks the analysis result from the situation analyzing section 24 or the displays on the display sections 23-1 to 23-n which are displaying the images from the monitor camera sections 1, and sends the information to the multiplexer section 27.

Figure 4:
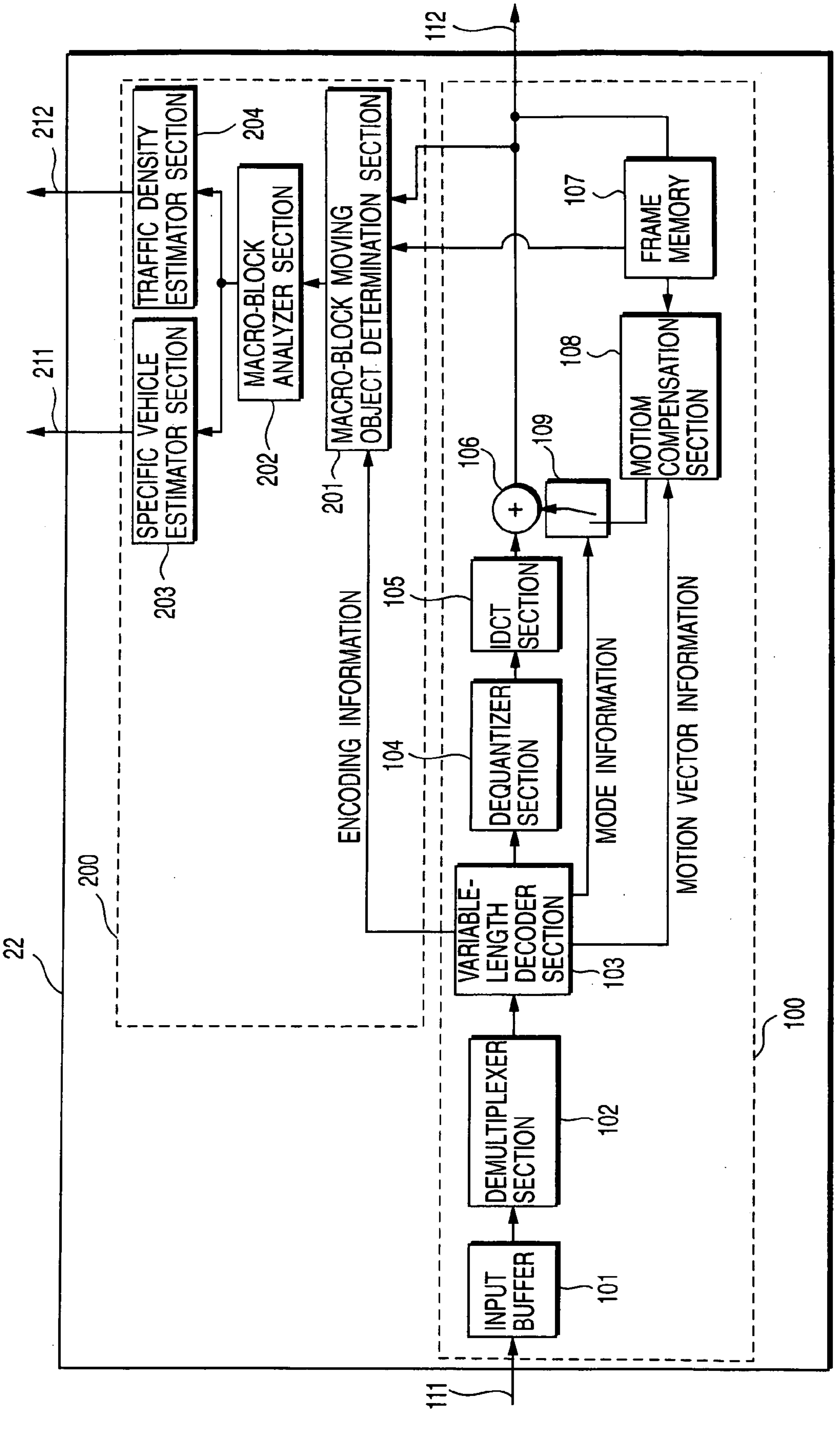
FIG. 4 is a block diagram showing the arrangement of a video decoder/analyzer section of the first embodiment.

FIG. 4 shows the arrangement of a video decoding/analyzing apparatus using a video decoding processing apparatus based on the present invention as the arrangement of each of the video decoder/analyzer sections 22-1 to 22-n of the first embodiment. This video decoding/analyzing apparatus is formed from two sections: a video decoder section 100 and a traffic density analyzer section 200.

In the video decoder section 100, video encoded data input through a transmission channel or storage medium is temporarily stored in an input buffer 101. The video encoded data read out from the input buffer 101 is demultiplexed by a demultiplexer section 102 on the basis of syntax in units of frames and output to a variable-length decoder section 103. The variable-length decoder section 103 decodes the variable-length code of information of each syntax and outputs decoded information, and mode information and motion vector information of each macro block.

In the variable-length decoder section 103, if the mode of a macro block is INTRA, a mode change-over switch 109 is turned off. Hence, quantized DCT coefficient information decoded by the variable-length decoder section 103 is inverse-quantized by a dequantizer section 104 and then subjected to inverse discrete cosine transformation by an IDCT section 105. As a result, a reconstructed video signal is generated. This reconstructed video signal is stored in a frame memory 107 as a reference video signal through an adder 106 and also output as a decoded video signal 112.

In the variable-length decoder section 103, if the mode of a macro block is INTER and NOT_CODED, the mode change-over switch 109 is turned on. Hence, the quantized DCT coefficient information decoded by the variable-length decoder section 103 is inverse-quantized by the dequantizer section 104 and then subjected to inverse discrete cosine transformation processing by the IDCT section 105. The output signal from the IDCT section 105 is added, by the adder 106, to the reference video signal which is motion-compensated by a motion compensation section 108 on the basis of the motion vector information decoded by the variable-length decoder section 103, thereby generating a decoded video signal 112. This decoded video signal 112 is stored in the frame memory 107 as a reference video signal and also extracted as a final output.

On the other hand, in the traffic density analyzer section 200, a moving object determination section 201 for determining a moving object in units of macro blocks determines whether a macro block is a moving object on the basis of encoding information output from the variable-length decoder section 103, the decoded video signal of the current frame output from the adder 106, and the decoded video signal (reference video signal) of the previous frame output from the frame memory 107. The encoding information is information contained in video encoded data and variable-length-decoded by the variable-length decoder section 103. More specifically, encoding information is mode information or motion vector information.

For example, if the mode of a macro block of interest is INTRA or INTER_CODED on the basis of mode information, the moving object determination section 201 temporarily determines that the macro block is highly probably a moving object, and determines a moving object by comparing the decoded video signal of the current frame with that of the previous frame only for this macro block. Alternatively, the moving object determination section 201 may temporarily determine on the basis of, e.g., motion vector information that a macro block where large motion vectors concentrate is highly probably a moving object, and determine a moving object by comparing the decoded video signal of the current frame with that of the previous frame only for the macro block.

The determination result from the moving object determination section 201 is sent to a macro-block analyzer section 202, where image analysis of the macro block determined as a moving object is done. The image analysis result for this macro block is sent to a specific vehicle estimator section 203 and traffic density estimator section 204.

Figure 5:
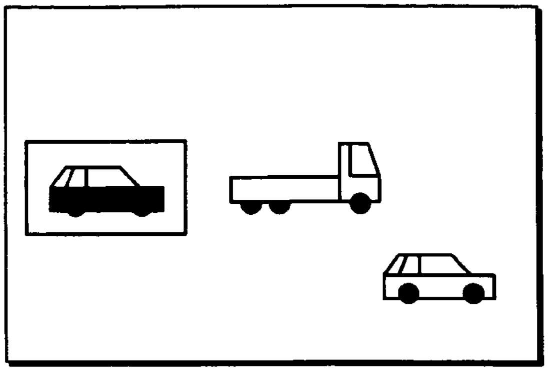
FIG. 5 is a view showing an example of estimation of a specific vehicle in the first embodiment.

The specific vehicle estimator section 203 estimates a specific vehicle from a color and shape in the image analysis result for the macro block and outputs an estimation result 211. FIG. 5 shows an example in which a specific vehicle is estimated from specific color and shape. To determine the color of a vehicle, first, color correction is performed in accordance with the environment to set a color space. The color of vehicle is determined in this color space. The shape of vehicle is determined by pattern matching. The velocity of vehicle is measured by marking a specific vehicle determined in this way.

Figure 6:
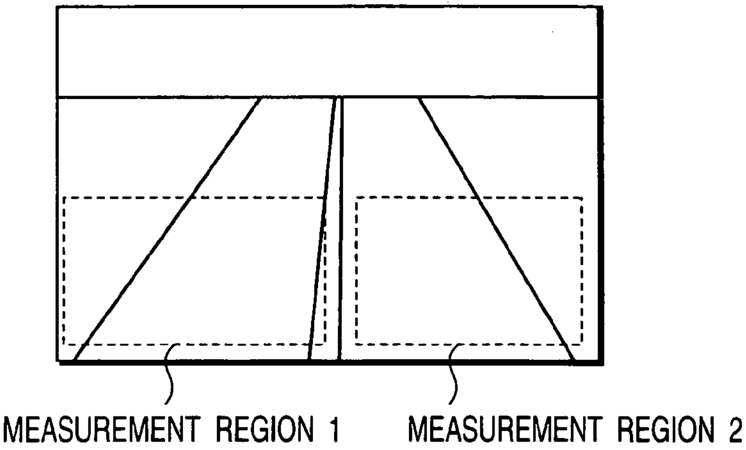
FIG. 6 is a view showing the estimation range in estimating the traffic density in the first embodiment.

The traffic density estimator section 204 sets a specific region on the screen from the image analysis result for the macro block, estimates the traffic density from the average velocity and number of moving objects that pass through the specific region, and outputs an estimation result 212. FIG. 6 shows an example in which measurement regions 1 and 2 are set in units of lanes as specific regions (this example shows two lanes), and the traffic density is estimated by calculation on the basis of the average velocity and number of moving objects that pass through measurement regions 1 and 2.

Figure 7:
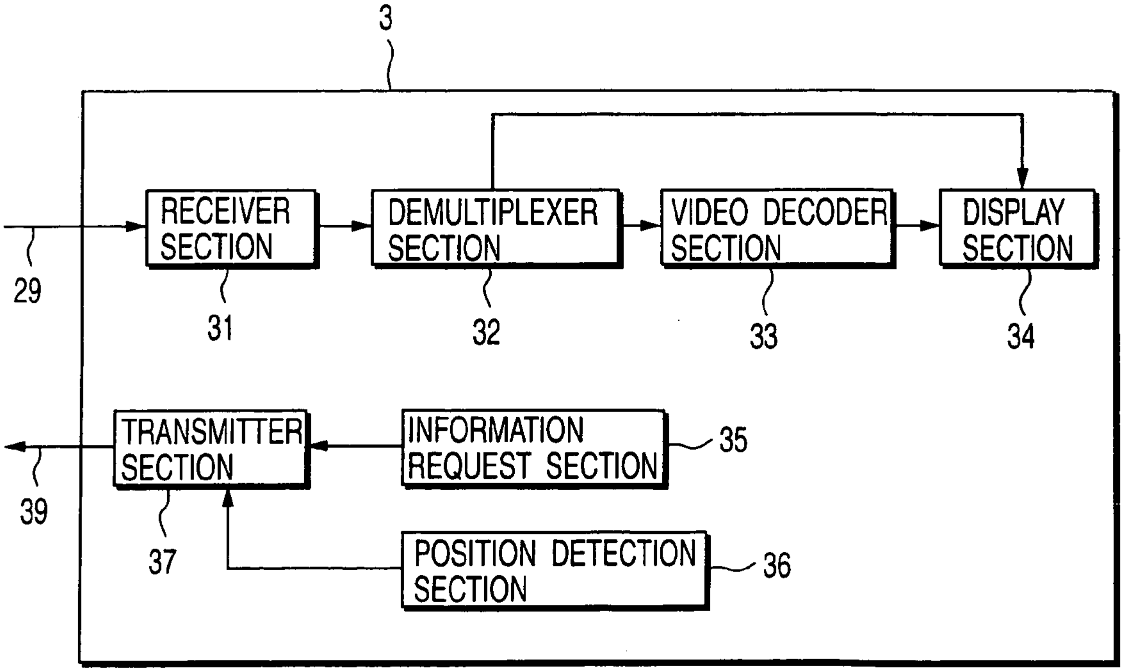
FIG. 7 is a block diagram showing the arrangement of a terminal section of the first embodiment.

FIG. 7 shows the arrangement of the terminal section 3 of this embodiment. A receiver section 31 receives information sent from the monitoring center 2. A demultiplexer section 32 demultiplexes video encoded information and additional information. The video encoded information is decoded by a video decoder section 33, so a decoded image and additional information are displayed on a display section 34. On the other hand, request information for an information request section 35 serving as an information input section for inputting information requested by the user and position information from a position detection section 36 for detecting the position of the terminal are transmitted to the monitoring center 2 through a transmission section 37.

(Second Embodiment)

Figure 8:
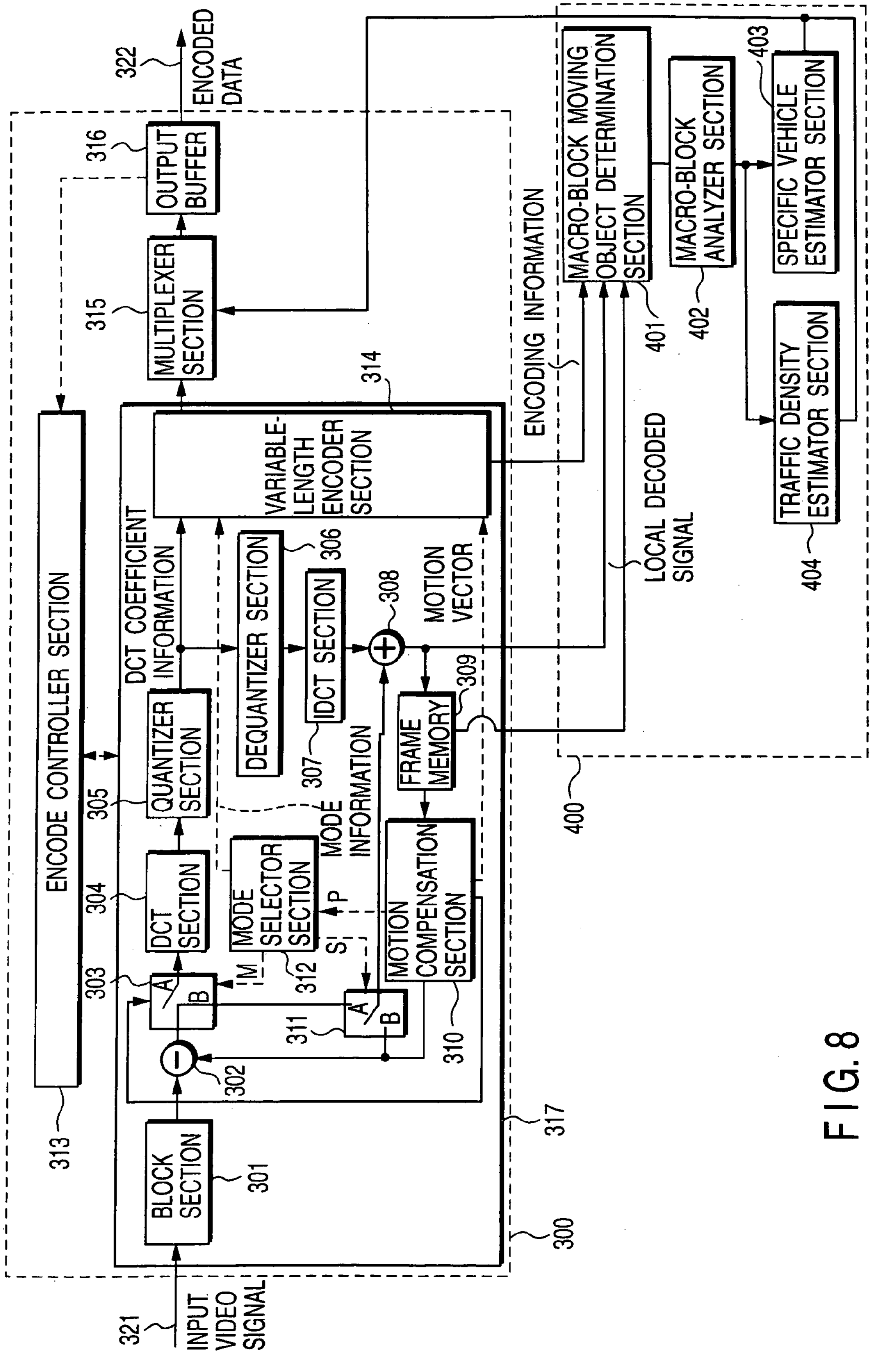
FIG. 8 is a block diagram showing the arrangement of a video encoding/analyzing apparatus according to the second embodiment of the present invention.

FIG. 8 is a block diagram of a video encoding/analyzing apparatus which combines a video traffic density analysis apparatus according to the second embodiment of the present invention with a video encoding apparatus.

Referring to FIG. 8, an input video signal 321 is segmented into a plurality of macro blocks (each block has 16×16 pixels) by a block section 301. The input video signal segmented into macro blocks is input to a subtracter 302. The difference from a predicted video signal is calculated to generate a prediction residual error signal. One of the prediction residual error signal and the input video signal from the block section 301 is selected by a mode selection switch 303 and subjected to discrete cosine transformation by a DCT (Discrete Cosine Transformation) section 304.

The DCT coefficient data obtained by the DCT section 304 is quantized by a quantizer section 305. The signal quantized by the quantizer section 305 is branched to two signals. One signal is variable-length-encoded by a variable-length encoder section 315. The other signal is sequentially subjected to processing operations by a dequantizer section 306 and IDCT (inverse discrete cosine transformation processing) section 307, which are opposite to those by the quantizer section 305 and DCT section 304, and then added, by an adder 308, to the predicted video signal input through a switch 311, whereby a local decoded signal is generated. This local decoded signal is stored in a frame memory 309 and input to a motion compensation section 310. The motion compensation section 310 generates a predictive picture signal and sends necessary information to a mode selector section 312.

The mode selector section 312 selects, one of a macro block for which inter-frame encoding is to be performed and a macro block for which intra-frame encoding is to be performed, on the basis of prediction information P from the motion compensation section 310 in units of macro blocks. More specifically, for intra-frame encoding (INTRA encoding), mode selection switch information M is set to A, and switch information S is set to A. For inter-frame encoding (INTER encoding), the mode selection switch information M is set to B, and the switch information S is set to B.

The mode selection switch 303 is switched on the basis of the mode selection switch information M, while the switch 311 is switched on the basis of the switch information S. Modes include the intra mode (INTRA), inter mode (INTER), and non coding mode (NON_CODED). One of these modes is made to correspond to each macro block. More specifically, an INTRA macro block is an image region for intra-frame encoding, an INTER macro block is an image region for inter-frame encoding, and a NOT_CODED macro block is an image region that requires no encoding.

In a traffic density analyzer section 400, encoded information output from a variable-length encoder section 314, the local decoded signal output from the adder 308 and the local decoded signal of the previous frame output from the frame memory 309 are input to a macro-block moving object determination section 401. The macro-block moving object determination section 401 determines whether the macro block is a moving object that moves in the screen, as in the first embodiment, and inputs the determination result to a macro-block analyzer section 402.

The macro-block analyzer section 402 performs image analysis for the pixels of the macro block which is determined by the macro-block moving object determination section 401 as a moving object, as in the first embodiment, and sends the analysis result to a specific vehicle estimator section 403 and traffic density estimator section 404.

The specific vehicle estimator section 403 estimates a specific vehicle from a color and shape in the image analysis result for the macro block, as in the first embodiment. The traffic density estimator section 404 also sets a specific region on the screen on the basis of the image analysis result for the macro block, and estimates the traffic density from the velocities and areas of moving objects that pass through the specific region in the image analysis result, as in the first embodiment. The estimation results from the specific vehicle estimator section 403 and traffic density estimator section 404 are input to a specific object synthesis/display section (not shown) and also input to a multiplexer section 315 of a video encoder section 300.

An encode controller section 313 controls an encoder section 317 on the basis of encoding information for the encoder section 317 and the buffer amount of an output buffer 316. The video encoded data encoded by the variable-length encoder section 314 is multiplexed with the specific vehicle determination result from the specific vehicle estimator section 403 by the multiplexer section 315 and sent to the transmission system or storage medium as encoded data after the transmission rate is smoothed by the output buffer 316.

Referring to FIG. 8, the traffic density analyzer section 400 uses the local decoded signal and that of the previous frame from the frame memory 309. However, the same effect as described above can be obtained even using the input video signal and that of the previous frame.

When the video encoding/analyzing apparatus shown in FIG. 8 is built in the traffic density monitoring system shown in FIG. 1, the video encoding/analyzing apparatus is applied to the monitor camera section 1.

As has been described above, according to the present invention, a traffic density analysis apparatus based on an encoded video, which can stably analyze the traffic density at a high speed, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A traffic density analysis method comprising:

decoding encoded video data obtained by encoding a video signal corresponding to an analysis region to obtain a decoded video signal and code information including mode information and vector information;

determining a moving object in units of a macroblock on the basis of the decoded video signal, the code information and a previously decoded video signal;

analyzing a macroblock determined as the moving object;

setting a specific region in a screen using an analysis result of the macroblock determined as the moving object; and estimating a traffic density in the analysis region from information related to the moving object passing through the specific region, wherein the determining includes temporarily determining that the macroblock of INTRA or INTER_CODED is highly probably a moving object, and comparing the decoded video signals of the current and previous frames only for the macroblock to determine the moving object.

2. A traffic density analysis method comprising:

decoding encoded video data obtained by encoding a video signal corresponding to an analysis region to obtain a decoded video signal and code information including mode information and vector information;

determining a moving object in units of a macroblock on the basis of the decoded video signal, the code information and a previously decoded video signal;

analyzing a macroblock determined as the moving object;

setting a specific region in a screen using an analysis result of the macroblock determined as the moving object; and estimating a traffic density in the analysis region from information related to the moving object passing through the specific region, wherein the determining includes determining that a macroblock where large motion vectors concentrate is highly probably a moving object, and comparing the decoded video signals of the current and previous frames only for the macroblock to determine a moving object.

3. A method for transmitting traffic information, comprising:

capturing an image in a monitoring region to be monitored for a traffic density;

encoding a video signal corresponding to the image to output encoded video data;

decoding the encoded video data to output a decoded video signal and code information including mode information and vector information;

determining a moving object in units of a macroblock on the basis of the decoded video signal, the code information and a previously decoded video signal;

analyzing a macroblock determined as the moving object;

setting a specific region in a screen using an analysis result of the macroblock determined as the moving object;

estimating a traffic density in the monitoring region from information related to the moving object passing through the specific region; and transmitting traffic information including the traffic density and video information, wherein the encoding includes compress-encoding a video signal, the transmitting includes transmitting the encoded video data, and the determining includes temporarily determining that the macroblock of INTRA or INTER_CODED is highly probably a moving object, and comparing the decoded video signals of the current and previous frames only for the macroblock to determine the moving object.

4. A method for transmitting traffic information, comprising:

capturing an image in a monitoring region to be monitored for a traffic density;

encoding a video signal corresponding to the image to output encoded video data;

decoding the encoded video data to output a decoded video signal and code information including mode information and vector information;

determining a moving object in units of a macroblock on the basis of the decoded video signal, the code information and a previously decoded video signal;

analyzing a macroblock determined as the moving object;

setting a specific region in a screen using an analysis result of the macroblock determined as the moving object;

estimating a traffic density in the monitoring region from information related to the moving object passing through the specific region; and transmitting traffic information including the traffic density and video information, wherein the determining includes determining that a macroblock where large motion vectors concentrate is highly probably a moving object, and comparing the decoded video signals of the current and previous frames only for the macroblock to determine the moving object.

* * * * *